United States Patent [19]

Krishna et al.

[11] Patent Number: 6,161,173
[45] Date of Patent: Dec. 12, 2000

[54] INTEGRATION OF MULTI-STAGE EXECUTION UNITS WITH A SCHEDULER FOR SINGLE-STAGE EXECUTION UNITS

[75] Inventors: Ravi Krishna, Milpitas; Amos Ben-Meir, Cupertino; John G. Favor, San Jose, all of Calif.

[73] Assignee: Advanced Micro Devices, Inc., Suunyvale, Calif.

[21] Appl. No.: 09/307,316

[22] Filed: May 7, 1999

Related U.S. Application Data

[63] Continuation of application No. 08/590,383, Jan. 26, 1996, abandoned.

[51] Int. Cl.[7] .................................................. G06F 9/24
[52] U.S. Cl. ............................................................ 712/214
[58] Field of Search .............................. 712/23, 205, 214, 712/216

[56] References Cited

U.S. PATENT DOCUMENTS

| | | | |
|---|---|---|---|
| 5,471,593 | 11/1995 | Branigin et al. | 712/235 |
| 5,553,256 | 9/1996 | Fetterman et al. | 712/235 |
| 5,592,679 | 1/1997 | Yung | 712/23 |
| 5,745,724 | 4/1998 | Favor et al. | 712/213 |
| 5,794,063 | 8/1998 | Favor | 712/23 |
| 5,802,386 | 9/1998 | Kahle et al. | 712/23 |
| 5,809,273 | 9/1998 | Favor et al. | 712/210 |
| 5,819,056 | 10/1998 | Favor | 712/204 |
| 5,920,713 | 7/1999 | Favor | 712/236 |

*Primary Examiner*—David Y. Eng
*Attorney, Agent, or Firm*—Skjerven Morrill MacPherson LLP; David T. Millers

[57] ABSTRACT

A superscalar processor includes a central scheduler for multiple execution units. The scheduler presumes operations issued to a particular execution unit all have the same latency, e.g., one clock cycle, even though some of the operations have longer latencies, e.g., two clock cycles. The execution unit that executes the operations having with longer than expected latencies, includes scheduling circuitry that holds up particular operation pipelines when operands required for the pipelines will not be valid when the scheduler presumes. Accordingly, the design of the scheduler can be simplified and can accommodate longer latency operations without being significantly redesigned for the longer latency operations.

15 Claims, 5 Drawing Sheets

Microfiche Appendix Included
(1 Microfiche, 55 Pages)

INTEGRATION OF MULTI-STAGE EXECUTION UNITS WITH A SCHEDULER FOR SINGLE-STAGE EXECUTION UNITS

CROSS REFERENCE TO RELATED APPLICATION

This application is continuation of U.S. patent application Ser. No. 08/590,383, now abandoned, which was filed Jan. 26, 1996 and is hereby incorporated by reference in its entirety.

REFERENCE TO MICROFICHE APPENDIX

The present specification comprises a microfiche appendix. The total number of microfiche sheets in the microfiche appendix is one. The total number of frames in the microfiche appendix is 55.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

The invention relates to processing systems and particularly to scheduling execution of operations in a superscalar processor.

2. Description of Related Art

Instruction sets for reduced instruction set computer (RISC) processors are generally limited to simple instructions that can be executed in relatively few processor clock cycles. RISC instruction sets are also limited so that most instructions require the same number of clock cycles for execution. This simplifies execution units that execute the instructions and circuitry that controls instruction pipelines during execution of a program. The simplification of this circuitry often decreases circuit area and cost of a RISC processor and allows the processor to operate at a higher clock rate.

Complex instruction set computer (CISC) processors have instruction sets that include both simple and complex instructions. Accordingly, it is often difficult or impractical to implement execution of the complex instructions in the same number of clock cycles as the simpler instructions. Conventionally, handling instructions that require different numbers of clock cycles to complete is more complex than handling instructions that require the same number of clock cycles.

Schedulers, execution pipelines, and execution units that directly execute CISC instructions must account for the different execution times. This can increase circuit complexity and area and can reduce overall performance.

An alternative architecture for a CISC processor includes a CISC instruction decoder and a RISC processing core. With this architecture, the CISC instruction decoder coverts each CISC instruction into one or more RISC-type operations that the RISC processing core executes. Typically, the RISC processing core has less complex and faster circuitry that operates at higher frequency and executes more instructions per clock cycle than could a conventional CISC processing core which directly executed the CISC instructions.

U.S. patent application Ser. No. 08/590,383, now abandoned, describes a superscalar processor having a RISC processing core. A scheduler in the processing core schedules operations for execution by multiple execution units including a load unit, a store unit, and two register units. The register units execute "register" operations that, when completed and committed, manipulate the contents of a register file of the processor. The register operations do not require data input or output from outside the processor. For other types of RISC operations executed by such a processor, other execution units can be added, and the scheduler can be expanded to add independent pipelines for the new execution units. However, this increases the complexity of the scheduler and may not provide a proportional increase in processor performance. For example, adding separate pipelines for specific types of operations does not greatly increase number of operations executed per cycle if those types of operations are rare in the code executed. In particular, in code executing many floating-point or multimedia arithmetic operations, register operations that perform integer arithmetic may be relatively rare so that a processing circuit for register operations is often empty or under utilized. Similarly, in code executing many register operations, floating-point or multimedia operations may be relatively rare, and a processing circuit for floating-point or multimedia operations may be often empty or under utilized. Accordingly, to reduce scheduler complexity without a significant performance penalty, it is desirable in some cases, to have different types of operations share the same scheduling pipeline. However, a difficulty arises when the instructions sharing a scheduling pipeline require different numbers of cycles for execution. Methods and systems for adding operations having different numbers of execution cycles to the same scheduling pipeline are sought.

SUMMARY

A superscalar processor includes a central scheduler for multiple execution units. The scheduler presumes operations issued to a particular execution unit all have the same latency, e.g., one clock cycle, even though some of the operations have longer latencies, e.g., two clock cycles. The execution unit that executes the operands with longer than expected latencies, includes scheduling circuitry that holds up particular operation pipelines when operands required for the pipelines will not be valid when the scheduler presumes. Accordingly, the design of the scheduler can be simplified and can accommodate longer latency operations without being significantly redesigned for the longer latency operations.

In one embodiment of the invention, a main scheduler schedules execution of operations and allots a single clock cycle for an execution unit to complete execution of the instruction even though the execution unit is unable to execute some instructions in a single clock cycle. Local scheduling circuitry controls execution pipelines having latency of two or more clock cycles. In particular, the local scheduling circuitry stops the main scheduler from issuing a selected operation if the latency of another operation would create a conflict with the main scheduler issuing the selected operation. The distribution of the scheduling circuitry between a main scheduler and an execution unit allows simplification of the main scheduler. Additionally, a scheduling architecture for single-stage instructions can be expanded to accommodate instructions with latencies greater than one clock cycle with only minor changes to the scheduler and addition of an execution unit that includes the local scheduling circuitry.

In another embodiment of the invention, a processor includes a scheduler and an execution unit with local scheduling circuitry. The execution unit is capable of executing a first type of operation having a first latency and a second type of operation having a second latency that differs from the first latency. The scheduler issues operations to the execution unit for execution upon determining that operands required for the operation will be valid when the operation issues, but the scheduler bases the determination on a presumption that operations issued to the execution unit complete after the first latency. Since the presumption is incorrect for the second type of operation, the execution unit has scheduling circuitry that holds up issue of an operation when an operand that the schedule determines will be valid when the operation issues actually will not be valid.

In accordance with another aspect of the invention, the scheduler comprises circuitry that forwards to the execution unit a plurality of operand signals and a selection signal that identifies one of the operand signals as a source of an operand for an operation selected for issue. In the execution unit, a bypass circuit changes the selection signal when the presumption used in the scheduler causes the scheduler to incorrectly identify the operand signal that provides the operand. An issue control circuit asserts a hold signal to prevent the scheduler from issuing an operation when none of the plurality of operand signals can provide a valid operand for the operation.

In accordance with another aspect of the invention, the processor further includes a register file, a buffer, and an operation commit circuit. The buffer stores results from speculative execution of operations in the execution unit. The operation commit unit writes a result corresponding to an operation to the register file only after determining that a program flow requires execution of the operation and speculative execution of the operation is complete. Since the scheduler can incorrectly indicate to the commit unit that speculative execution of an operation is complete, the execution is coupled to provide to the operation commit unit a signal that confirms when the speculative execution of operation of the second type is complete.

BRIEF DESCRIPTION OF THE DRAWINGS

Use of the same reference symbols in different figures indicates similar or identical items.

DETAILED DESCRIPTION

A processor includes a main scheduler, which has primary control of speculative execution of operations. The main scheduler issues operations to execution units, selects operands for the execution units, and temporarily stores results from the execution units until an operation commit unit can safely commit the results to a register file. In scheduling speculative execution, the scheduler allocates a fixed latency (typically one clock cycle) between issuing an instruction to an execution pipeline and the execution pipeline returning a result. However, for at least some instructions, the execution pipeline has a longer latency. For the longer latency operations, an execution unit or units in the execution pipeline contains local scheduling circuitry. The execution unit holds up the main scheduler as required when the scheduler's reliance on the fixed latency would cause an error. The execution unit also connects to the operation commit unit and before specific operations can be committed, confirms that execution of operations has completed.

Figure 1:
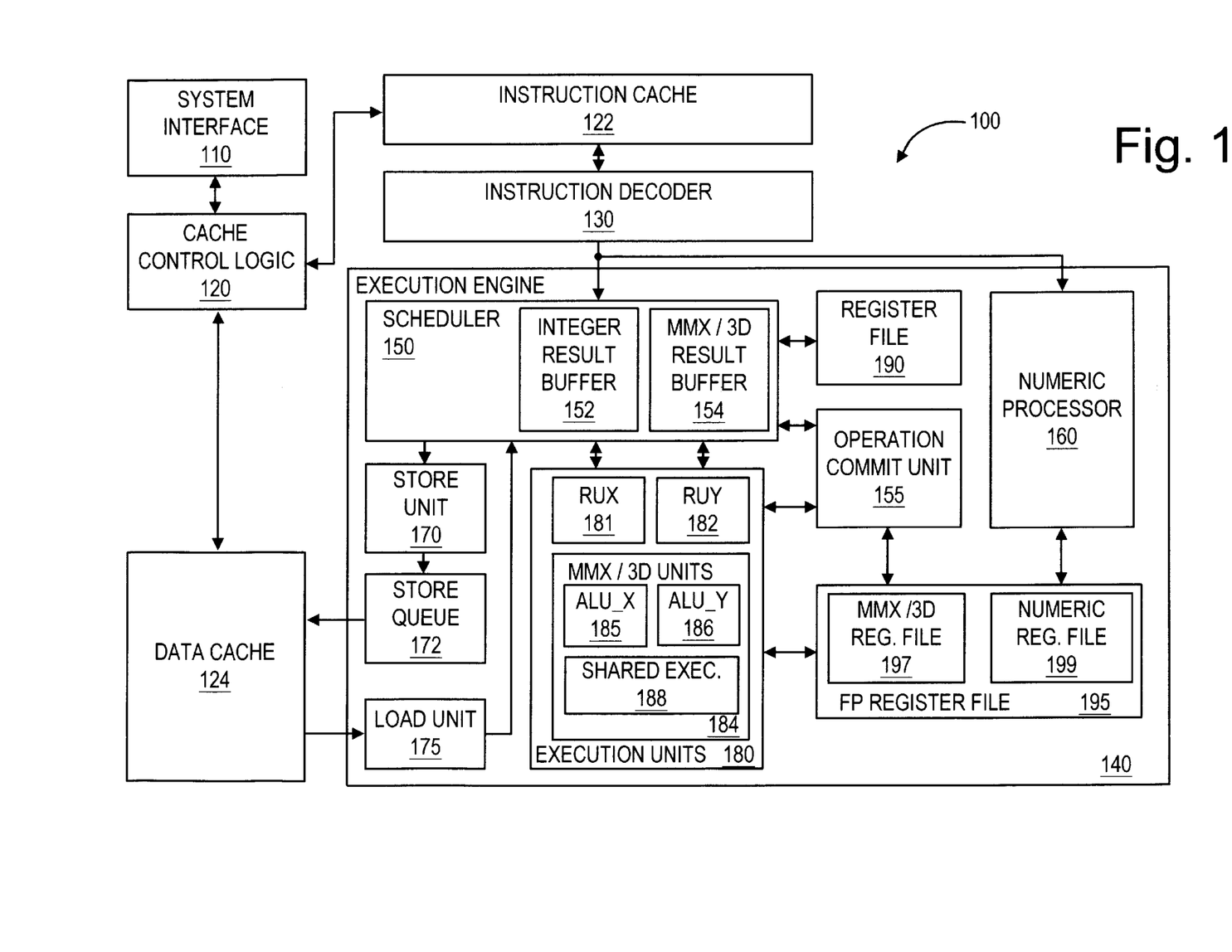
FIG. 1 is a block diagram of a processor in accordance with an embodiment of the invention.

FIG. 1 shows a block diagram of a processor 100 in accordance with an embodiment of the invention. Processor 100 includes a system interface 110, control logic 120, a level-1 instruction cache 122, a level-1 data cache 124, an instruction decoder 130, and an execution engine 140. System interface 110 provides access to the address space of a computer system including external memory and devices on local busses. In an exemplary embodiment, system interface 110 provides an interface to a socket 7 or super 7 bus. Cache control logic 120 controls a memory hierarchy including internal (level-1) caches 122 and 124 and external (level-2) caches (not shown). Cache 122 is an instruction cache and in the exemplary embodiment, is a two-way set-associative cache containing storage for 32 KB of instructions and additional predecode information. U.S. Pat. No. 5,819,056, entitled "Instruction Buffer Organization Method and System" and U.S. Pat. No. 5,809,273, entitled "Instruction Predecode and Multiple Instruction Decode" describe suitable instruction caches and predecode systems and are hereby incorporated by reference in their entirety. Data cache 124 is a cache through which execution engine 140 accesses main memory for load and store operations. In the exemplary embodiment, data cache 124 is a two-way setassociative cache containing storage for 32 KB of data. Data cache 124 uses pipelined banks of dual-ported memory that allows one read and one write per cycle to provide faster operation and avoid access conflicts.

Instructions from the main memory are predecoded and loaded into instruction cache 122. The original instructions are CISC instructions such as found in the PC industry standard x86 instruction sets. While loading instruction cache 122, instruction bytes are predecoded for rapid identification of instruction boundaries. Predecoding appends code bits to each byte to indicate an offset from the byte to the start of a following instruction assuming that the instruction byte is the first byte in an instruction. Up to 16 bytes of CISC instructions are fetched out of instruction cache 122 per cycle.

Instruction decoder 130 executes unconditional branch instructions, performs branch prediction for conditional branch instructions, and converts the CISC instructions to RISC operations for execution engine 140. A single CISC instruction from instruction cache 122 decodes into zero (for unconditional branch instructions), one, or several RISC operations. Each clock cycle, instruction decoder 130 decodes one or multiple CISC instructions to create a set of operations and then loads the set of operations into execution engine 140. In the exemplary embodiment, instruction decoder 140 includes a hardware decoder (MacDec) for the most common CISC instructions and a vector decoder for uncommon and more complex CISC instructions. The vector decoder contains a ROM sometimes referred to as emcode ROM that contains sequences of RISC operations. The vector decoder selects an address in the emcode ROM according to a CISC instruction being decoded and replaces or modifies portions of the RISC operations read from the emcode ROM as required to convert the CISC instruction to corresponding RISC operations. U.S. Pat. No. 5,920,713, entitled "Instruction Decoder Including Two-Way Emulation Code Branching" and U.S. Pat. No. 5,794,063, entitled "Instruction Decoder Including Emulation Using Indirect Specifiers," which are hereby incorporated by reference herein in their entirety, describe decoding suitable for instruction decoder 140.

Execution engine 140 has a superscalar, out-of-order, reduced instruction set computing (RISC) architecture and includes: an operation scheduler 150; an operation commit unit (OCU) 155; a numeric processor 160, execution units 170, 175, and 180; a register file 190; and a floating point (FP) register file 195. Instruction decoder 130 sends information describing operations to scheduler 150. Instruction decoder 130 also directs floating point instructions such as those historically handled by x87 math co-processors to numeric processor 160. Numeric processor 160 includes scheduling circuitry and execution units for a floating point execution pipeline that operates in parallel to the execution pipelines that scheduler 150 controls.

A scheduling reservoir in scheduler 150 stores the operation information that scheduler 150 uses to select and issue operations to execution units 170, 175, and 180 for speculative execution. Scheduler 150 issues operations to the execution units for execution, selects operands for the operations, receives results from execution units 170, 175, and 180, stores the results until the corresponding operations are committed and retired, and deletes operation information as operations are retired. The scheduling reservoir in scheduler 150 is partitioned into entries where each entry includes storage and logic associated with an operation.

Information in each entry describes either no operation (no-op) or an associated operation which is to be executed, is being executed, or has been speculatively executed. In the exemplary embodiment, sets of four entries are organized into groups referred to herein as rows even though entries may not be physically positioned in a row. The information associated with the four entries in a row is referred to herein as an op quad. Each row contains storage fields and logic associated with an Op quad as a group in addition to the storage fields and logic associated with individual operations.

Buffers 152 and 154 are collections of storage fields for entries in scheduler 150. In particular, each entry in scheduler 150 has a field (DestVal) for results of integer operations, and integer result buffer 152 represents the collection of DestVal fields for storing integer results. Additional fields (MDestVal) are for results from MMX and 3D NOW operations. In one embodiment of the invention, scheduler 150 has only two MDestVal fields per row, and each MDestVal field is shared by a pair of entries. Sharing an MDestVal field is possible because two consecutive operations decoded from CISC instructions cannot create conflicting uses of the shared MDestVal fields. Sharing the fields saves circuit area, but alternatively, scheduler 150 could include one MDestVal field per entry. MMX/3D result buffer 154 represents the collection of MDestVal fields for storing results of MMX and 3D NOW operations.

Scheduler 150 operates in many ways like a shift register. In particular, information (i.e., an op quad) in one row shifts each clock cycle to the next lower row if the next row is empty or an op quad in the next row is shifting or being retired. In the exemplary embodiment, scheduler 150 is six rows deep. Decoder 130 can load a new Op quad into the top row of scheduler 150 each clock cycle if instruction cache 122 contains the next instructions for decoding and the top row of scheduler 150 is empty or shifting an Op quad into a lower row. The Op quad shifts down from the top row towards a bottom row from which commit unit 155 retires Op quads. The position of an Op quad in scheduler 150 thus indicates the age or place in the program order for the Op quad; but for most operations, the position in scheduler 150 is independent of the stage of execution.

Logic in scheduler 150 searches the scheduling reservoir for operations to be issued to execution units 170, 175, and 180. Scheduler 150 includes four independent issue selection circuits, one for store unit 170, one for load unit 175, and two for execution unit 180. When scheduler 150 determines that the operands necessary for execution of a selected operation will be available, scheduler 150 issues the selected operation to the appropriate execution unit 170, 175, or 180. Execution units 175 and 180 execute the operations and return any operation results, including status or condition codes, to the entries of scheduler 150 that correspond to the operations executed (i.e., to result buffer 152 or 154). Store unit 170 loads a store queue 172 with values to be stored in data cache 124 when the operation is committed. Operation commit unit 155, which is coupled to scheduler 150, store queue 172, register file 190, and FP register file 195 commits (or otherwise makes permanent) the results of operations by writing the results to appropriate registers in register files 190 and 195, updating a status register, or causing store queue 172 to access data cache 124.

Each execution unit has corresponding operations which it can execute. Load unit 175 and store unit 170 execute load operations (LdOps) and store operations (StOps) respectively. For LdOps, load unit 175 accesses the address space of the processor through data cache 124, and when cache 124 returns data, load unit 175 stores the data in the entry of scheduler 150 that corresponds to the executed load operation. LdOps that load integer data load the integer data in the field of integer result buffer 152 corresponding to the instruction's entry. LdOps that loads floating point or multimedia data load that data in the field of result buffer 154 corresponding to the instruction's entry. Each loaded value remains in buffer 152 or 154 until OCU 155 commits the associated operation or determines the associated operation should not be committed. Thus, execution engine 140 can execute load operations speculatively without changing status registers, register files 190 or 195, or data stored at locations in the address space of the processor. For speculative execution of a StOp, store unit 170 loads store queue 172 with the data to be stored, and store queue 172 temporarily holds the data. Data from store queue 172 is written to address space of processor 100 through data cache 124 only after commit unit 155 determines the associated StOp should actually be executed.

Execution unit 180 executes instructions that do not require access to data cache 124 or external memory and have source and destination operands identified by register numbers for register file 190 or FP register file 195 Register file 190 contains integer size registers for integer operations. FP register file 195 contains larger registers for floating point, MMX, and 3D NOW operations. Although architecturally a single register file, register file 195 includes two physical register files 197 and 199. Physical register file 197 is closely associated with execution unit 180 and active when execution engine 140 is in an MMX/3D mode for executing MMX or 3D NOW operations. Physical register file 199 is closely associated with numeric processor 160 and active when execution engine 140 is in an FP mode for executing floating operations. Execution engine 140 switches between MMX/3D mode and FP mode when execution engine 140 encounters an operation of the wrong type for the current mode. For a mode switch, the contents of the currently active physical register file 197 or 199 is copied to the other physical register file 199 or 197.

Execution unit 180 includes multiple processing circuits that are capable of operating in parallel. In exemplary embodiment, execution unit 180 includes two processing circuits 181 and 182 for register operations (RegOps) and processing circuits 184 for MMX and 3D NOW operations (M3DOps). Processing circuits 181 and 182, which are sometimes referred to herein as RUX and RUY, respectively correspond to execution pipelines X and Y implemented in execution unit 180. Register operations nominally access registers in register file 190 for source and/or destination operands. Access is "nominally" to register file 190 because the actual source of the operands can be register file 190, result buffer 152, or a result bus from any of the execution units. Result buffer 152 or a result bus provides an operand if a previous operation changes the operand but has not been committed. The MMX/3D NOW operations that processing circuits 184 execute nominally access floating point register 195 for source or destination operands. The actual source operands for MMX/3D NOW operations may be from register file 195, result buffer 154, or a result bus of an execution unit.

As indicated above, scheduler 150 has two independent issue selection circuits that can issue up to two operations per cycle to execution unit 180 respectively for execution pipelines X and Y. In accordance with an aspect of the invention, execution unit 180 contains more than two processing circuits that can operate in parallel. In particular, an execution circuit 185 executes operations such as SIMD (single instruction multiple data) addition for execution pipeline X, and execution circuit 186 executes the same types of operations but for execution pipeline Y. Either execution pipeline X or Y can use a shared execution circuit 188, for example, for SIMD multiplications, subject to resource restrictions. Scheduling circuitry (not shown) in execution unit 180 asserts a hold signal to scheduler 150 when execution unit 180 does not have resources available for an operation that scheduler 150 is attempting to issue. For example, if scheduler 150 attempts to simultaneously issue two operations that require SIMD multiplications, execution unit 180 asserts a hold signal that prevents one of the operations from issuing.

In accordance with an aspect of the invention, execution units 180 execute operations having different latencies. In particular, processing circuits 181 and 182 execute one-stage operation, but processing circuits 184 executes one-stage operations and two-stage operations. Actual latencies can be one clock cycle, two clock cycles, or longer if execution pipelines are held up. To simplify scheduler 150, scheduler 150 operates under the presumption that all of the processing circuits in execution unit 180 have the same latency, one clock cycle.

Figure 2:
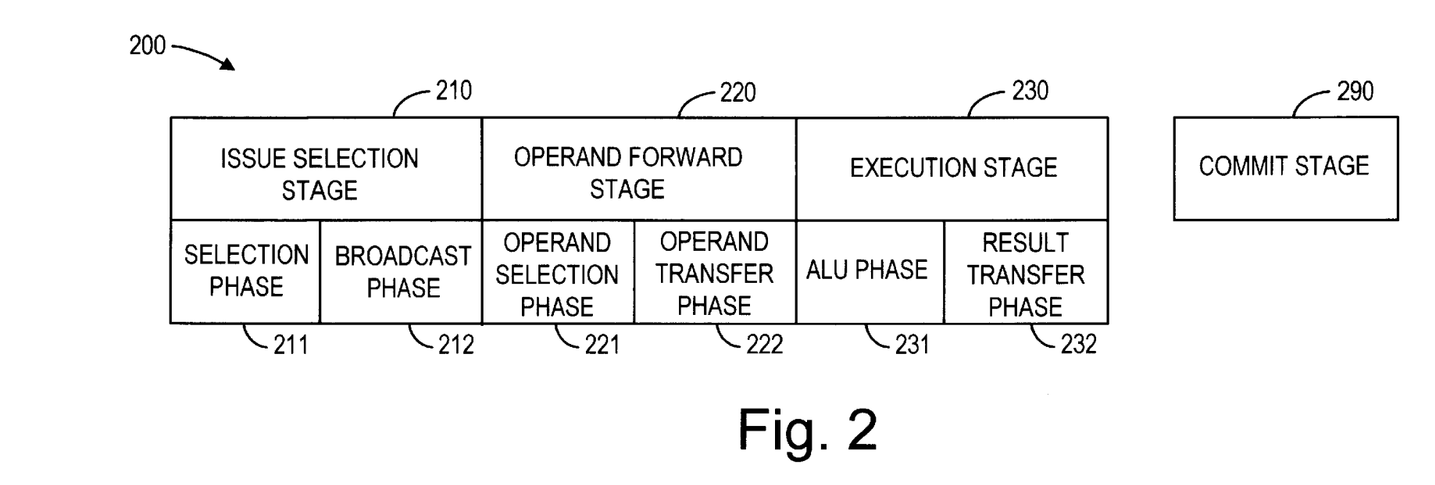
FIGS. 2 and 3 illustrate pipelines for operations respectively requiring one and two clock cycles for execution stages.
Figure 3:
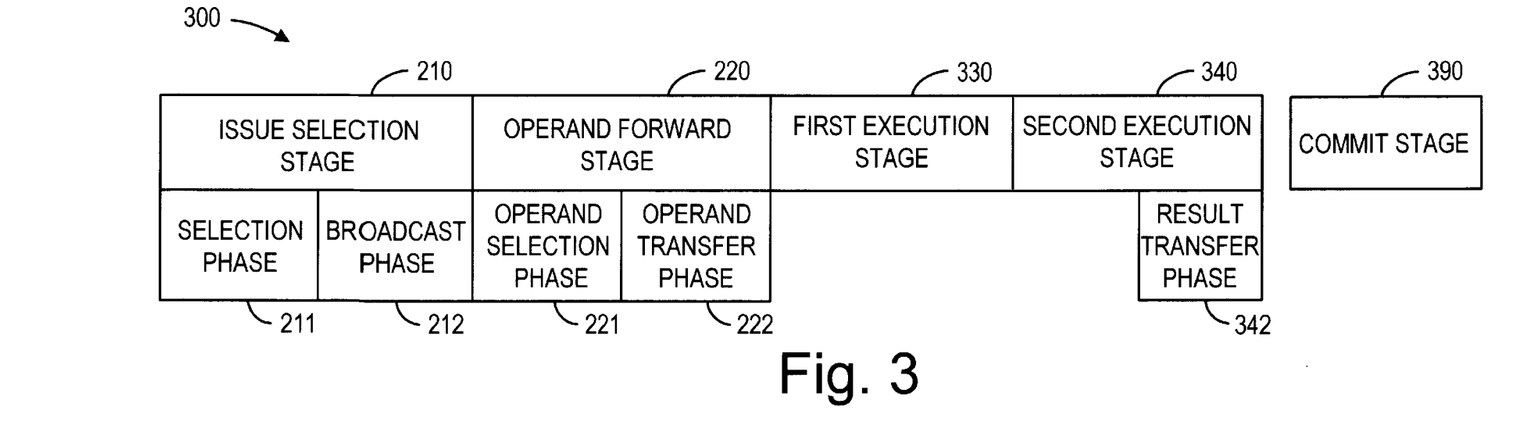

FIGS. 2 and 3 respectively show operation pipelines 200 and 300 associated with operations in execution engine 140. Before either pipeline 200 or 300 begins, cache control logic 120 fetches CISC instructions. A predecoder partially decodes each instruction word to simplify identification of instruction boundaries and loads the predecoded instructions into instruction cache 122. In each clock cycle, instruction decoder 140 decodes up to two CISC instructions from instruction cache 122, forms a new op quad, and loads the new op quad into the top row of scheduler 150 if the top row is empty or contains an older op quad that is shifting to another row. Each operation waits in scheduler 150 until being selected in operation pipeline 200 or 300.

Operation pipeline 200 is for register operations and includes an issue selection stage 210, an operand forward stage 220, a single execution stage 230, and a commit stage 290. Operation pipeline 300 is for operations such as MMX or 3D NOW multiplies which have two execution stages in processing circuits 184 (i.e., a two-stage execution pipeline). Operation pipeline 300 includes issue selection stage 210, operand forward stage 220, a first execution stage 330, a second execution stage 340, and a commit stage 390. Once an operation is selected in an issue selection stage 210, each stage of the pipeline 200 or 300 for the operation requires one clock cycle unless the pipeline is held up, for example, by an operation in one of the stages preventing operations at earlier stages from advancing. After completion of the final execution stage for the operation, e.g., stage 230 or 340, the results wait in scheduler 150, e.g., buffer 152 or 154, until commit stage 290 or 390 commits the results of the operation.

Each stage includes two phases that occur during the first and second halves of the system clock cycle. For example, issue selection stage 210 includes a selection phase 211 and a broadcast phase 212. During selection phase 211, scheduler 150 selects operations for issue to execution units 170, 175, and 180. In the exemplary embodiment, for example, four operation selections occur at once.

Specifically, issue selection logic of scheduler 150 scans entries from oldest to newest and selects the oldest unselected LdOp for load unit 175, the oldest unselected StOp for store unit 170, and two suitable operations for execution unit 180. The first selected operation for execution unit 180 is the oldest usnselected operation in a first class, and the selected second operation for execution unit 180 is the oldest unselected operation that is in a second class and is not the first selected operation. The first class of operations typically includes all operations that execution unit 180 can execute. For the exemplary embodiment, the first class includes all RegOps that processing circuits 181 and 182 execute and MMX and 3D NOW operations that processing circuits 184 execute. The second class of operations may be the same as the first class of operations so that scheduler 150 selects the oldest and next-to-oldest operations of the first class for issue to execution unit 180. However, in the exemplary embodiment, RUY pipeline 182 cannot execute every operation that RUX pipeline 181 can execute, and the second class of operations is a subset of the first class of operations. Issue selection logic that performs these functions is described in U.S. Pat. No. 5,745,724, issued Apr. 28, 1998, which is incorporated by reference herein in its entirety.

Issue selection does not consider operand dependencies. During broadcast phase 212 which is after selecting operations, scheduler 150 broadcasts information about the source operands of each selected operation to all scheduler entries, register files 190 and 195, and to external logic including processing circuits 184. Operations always advance from issue selection stage 210 to operand forward stage 220 unless a previously selected operation in the same pipeline fails to advance from operand forward stage 220 to an execution stage 230 or 330. Scheduler 150 advances an operation to operand forward stage 220 by changing a state field in the entry for the operation from indicating the operation is unselected to indicating the operation is selected.

Operand forward stage 220 includes an operand selection phase 221 and an operand transfer phase 222. During operand selection phase 221, scheduler 150 locates valid operands based on the information from broadcast phase 212. The source of a valid operand may be register file 190 or 195, an entry in scheduler 150 (e.g., buffer 152 or 154), or a result bus of an execution unit 170, 175, or 180.

Entries in scheduler 150 contain fields for immediate values for operations, fields for results from executed operations that have not been committed, and fields indicating which operands associated operations may change. In a search for the correct operand source, logic in scheduler 150 scans from the entry associated with the selected operation through entries associated with older operations (i.e., operations preceding in the program order). Register file 190 or 195 supplies a required source operand if scheduler 150 fails to find an older operation that affects the required source operand. Scheduler 150 selects an entry to supply the source operand if scheduler 150 identifies the entry as containing a completed operation that affects the source operand. Scheduler 150 selects a result bus of an execution unit as the source of an operand if scheduler 150 identifies the entry as containing an issued operation that affects the source operand. (One-stage operations should provide a valid result signal within a clock cycle.) If an older operation that affects a source operand is neither completed nor issued, the required operand is currently unavailable.

During operand transfer phase 222, scheduler 150 determines the status of each source operand, i.e., whether entries in scheduler 150 indicate a valid value is available from the designated source. Scheduler 150 also checks for hold signals from execution unit 180 for pipelines X and Y. Based on the determined validity of operands and the hold signals, scheduler 150 determines which of the operations selected for issue can be issued to an execution stage 230 or 330. Concurrently, each potential source of an operand, as identified in operand selection phase 221, forwards an operand (valid or not), and the execution units latch valid operands from selected ones of the possible sources.

In accordance with an aspect of the invention, scheduler 150 can incorrectly identify the proper source of an operand because scheduler 150 implements logic for one-stage operations that complete one clock cycle after being issued to execution unit 180. However, some operations require two clock cycles. As described further below, conversion circuitry in execution unit 180 or elsewhere can change the source of an operand when a source corresponds to a multi-stage operation. For example, if an older operation that affects a required operand is a two-stage operation, the conversion circuit changes the operand's source from buffer 154 to a result bus of execution unit 180 when the two-stage operation is in second execution stage 340 instead of being completed as scheduler 150 indicates.

When scheduler 150 selects a result bus of execution unit 180 as the source of an operand, a hold signal prevents the operation from issuing if the source operand will be invalid when required for the operation to issue.

Scheduler 150 advances each selected operation independently for each execution pipeline when scheduler 150 determines all the required operands are valid and the required execution unit is not held up. When scheduler 150 advances an operation, scheduler 150 changes an operation state in a state field of the entry for the operation to indicate that the operation is issued to an execution stage. If scheduler 150 determines a required operand is invalid or if the required execution unit indicates a hold up, scheduler 150 does not advance the associated operation to an execution stage. The selected operation can either be bumped from the operation pipeline by changing the operation state back to unselected, making the operation again eligible for issue selection, or the operation pipeline is held up with the operation state held at "selected for issue." When the operation is held up, operand transfer phase 222 of the next clock cycle forwards operands of the selected operation to the appropriate execution unit, and the execution unit starts processing the operation if all the operands are then valid.

Pipeline 200 illustrates the case where issue selection stage 210 selects a one-stage operation such as a RegOp for issue to execution unit 180. Scheduler 150 transmits an opcode and selects operands for execution unit 180 during operand forwarding stage 220. The operation issues from operand forward stage 220 to execution stage 230 if scheduler 150 determines all required operands for the operation are apparently valid and the execution pipeline for the operation is not held up. For the purpose of determining when operations complete and whether operands are valid, scheduler 150 presumes that execution unit 180 completes all issued operations in one clock cycle. This simplifies scheduling circuits but is incorrect for multi-stage operations. Execution unit 180 can change the operand selections or hold up a pipeline when scheduler 150 incorrectly determines a two-stage operation is complete or completing. In the exemplary embodiment, the two-stage operations only have destination operands nominally in FP register file 195, and execution unit 180 does not change the operand selections that scheduler 150 makes for RegOps. Execution unit 180 may change the selections for single-stage or multi-stage MMX or 3D NOW operations.

Execution stage 230 of a RegOp includes an ALU phase 231 in which an arithmetic logic unit (ALU) in processing circuit 181 or 182 processes the source operands of the RegOp according to the opcode of the RegOp being executed, and a result transfer phase 232 in which processing circuit 181 or 182 stores a result and status values in the appropriate entry in buffer 152 of scheduler 150. Stage 290 commits the result and status flags from the entry (or the result bus of the execution unit) to register file 190 and the architectural status flag register if and when it becomes safe to do so. After or just as an operation completes, commit unit 155 can commit the operation's result, and scheduler 150 can retire the operation by shifting the op quad containing the operation out of scheduler 150.

More generally a result remains in scheduler 150 for one or more clock cycles before being committed. Between completion and commitment, scheduler 150 supplies the result and status flags from the entry when required for execution of other operations.

Pipeline 300 illustrates the case where issue selection stage 210 selects an operation that has a two-stage execution pipeline. Processing circuits 184 execute all two-stage operations executed in execution unit 180. In accordance with an aspect of the invention, processing circuits 184 include circuits for scheduling multi-stage operations and determining resource conflicts. The operations requiring two execution stages are all MMX or 3D NOW operations. Accordingly, for operation pipeline 300, FP register file 195, result buffer 154, and result buses of execution unit 180 are the only possible sources of operands. For each operand, scheduler 150 identifies a source for the operand, and processing circuits 184 determine whether to use the identified source, select a different source for the operand, or hold up the pipeline because none of the possible source will provide a valid operand. Only the identification of result buffer 154 or a result bus as an operand source can be incorrect because commit unit 155 only commits results to FP register file 195 after the operation is truly complete. If scheduler 150 identifies an entry in buffer 154 as the source of an operand and that entry corresponds to an operation in execution stage 340, execution unit 180 selects a result bus to provide the operand. If scheduler 150 identifies a result bus scheduled to provide a result to an entry in buffer 154 and that entry corresponds to a two-stage operation in execution stage 330, execution unit 180 asserts to scheduler 150 a hold signal that prevents scheduler 150 from advancing the operation from stage 220 to stage 330 at the end of the current clock cycle.

At the end of the operand forward stage, if pipeline 300 is not held up, scheduler 150 changes a state field for an operation to indicate the operation is issued to the execution stage. After one clock cycle, the operation enters second execution stage 340, but scheduler 150 changes the state field for the operation to incorrectly indicate that the operation is completed. The scheduling circuitry in execution unit 180 asserts a control signal to commit unit 155 to prevent commit unit 155 from committing any op quad that contains an entry for an operation in execution stage 330 or 340. Upon completion of second execution stage 340, execution unit 180 writes the result to the MDestVal field in result buffer 154 corresponding to the entry for the operation. Commit unit 155 writes the results from buffer 154 or from a result bus of execution unit 180 to FP register file 195 when committing the associated operation.

Figure 4:
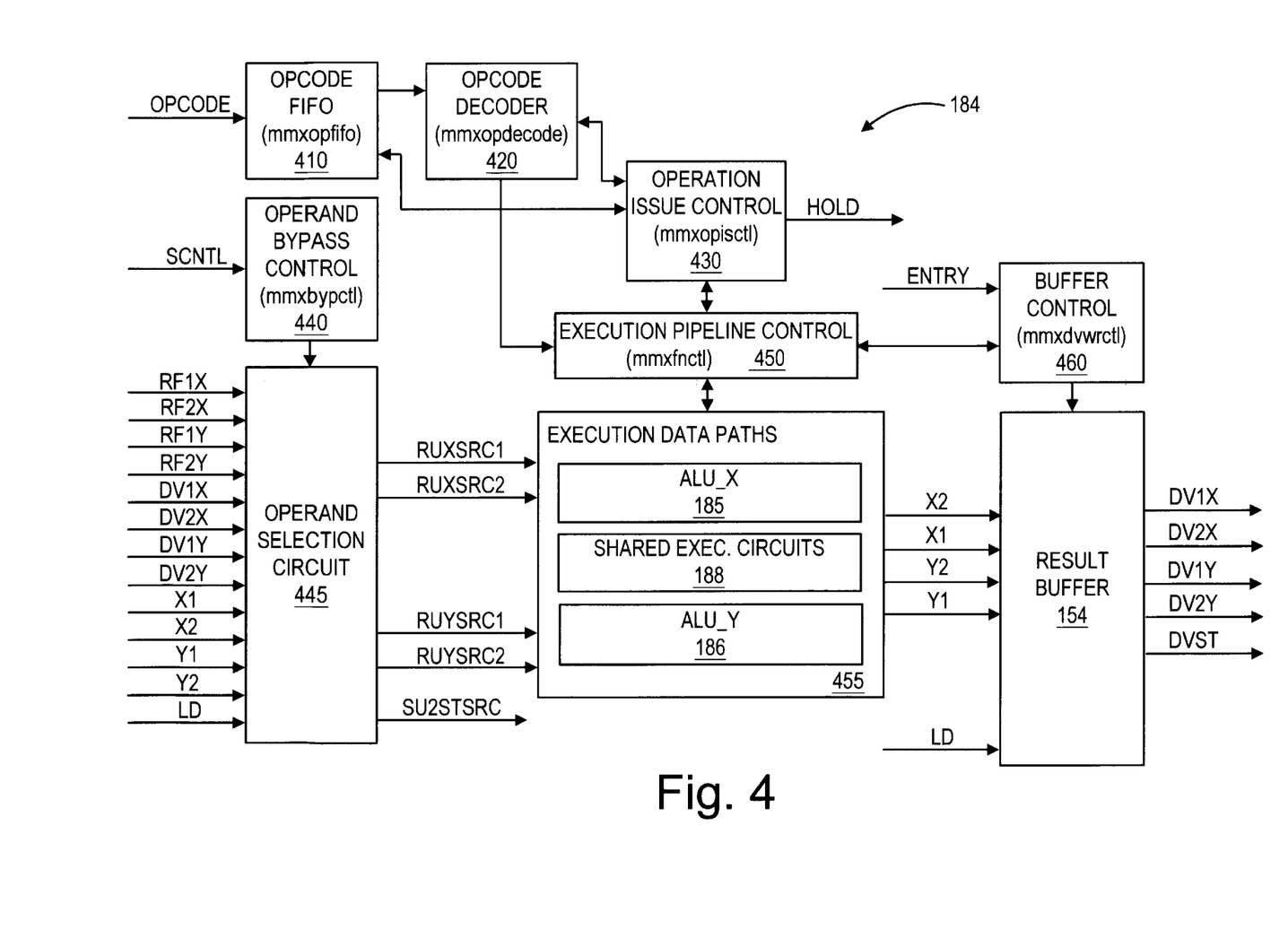
FIG. 4 is a block diagram of an execution unit having local scheduling for executing multi-stage operations when a main scheduler expects single-stage execution of operations.

FIG. 4 shows a block diagram including an embodiment of processing circuits 184. In the embodiment of FIG. 4, execution circuits 184 include an opcode FIFO buffer 410, an opcode decoder 420, an operation issue control circuit 430, an operand bypass control circuit 440, an operand selection circuit 445, an execution pipeline control circuit 450, and execution data paths 455. Opcode buffer 410 stores op codes for operations that scheduler 150 issues to execution circuits 184. Processing circuits 184 are capable of starting two operations in parallel and include two execution pipelines X and Y. Accordingly, buffer 410 registers up to two opcodes per clock cycle. Buffer 410 does not register a new opcode when the opcode represents an operation that processing circuits 181 or 182 handles, when scheduler 150 determines that at least one required source operand is invalid, or when operation issue control 430 asserts a hold for the pipeline corresponding to the new opcode.

For each execution pipeline, decoder 420 decodes the opcode in buffer 410 for the operation if any in the first stage of the execution pipeline and decodes the opcode in buffer 410 for the operation if any in the second stage of the execution pipeline. Execution pipeline control 450 receives control signals from decoder 420 and controls the execution data paths 455 to execute stages that decoder 420 indicates. As shown, data paths 455 include execution circuits 185 and 186 that are substantially the same and execute common operations such as MMX operations that add, subtract, compare, pack, unpack, swap, or perform logic operations on MMX operands. Execution circuits 185 and 186 can simultaneously start and execute to two operations of the same type in execution pipelines X and Y respectively. Only one of the two execution pipelines X and Y can use shared execution circuits 188 at a time. Accordingly, if scheduler 150 attempts to simultaneously issue two operations that require the same shared execution circuits, operation issue control circuit 430 asserts a hold signal that holds up one pipeline, and scheduler 150 issues only one of the operations that clock cycle. Similarly, if a first stage of an operation uses a shared execution circuit required for a second stage of an operation moving into its second execution stage, control circuit 430 issues a hold until the required shared resource is available.

Operand bypass control 440 receives signals SCNTL from scheduler 150 identifying sources that scheduler 150 selected for operands of operations in operand forward stage 220. Based on signals SCNTL and the actual status of operations in the execution pipelines X and Y, bypass control 440 controls operand selection circuit 445 to select source operand signals RUXSRCI and RUXSRC2 for pipeline X and signals RUYSRCI and RUYSRC2 for pipeline Y. Potential sources for the source operands include register file 195 which provides signals RF IX, RF2X, RFIY, and RF2Y, load unit 175 which provides signal LD, result buffer 154 which provides signals DV1X, DV2X, DV1Y, and DV2Y, and result buses of data paths 455 which provide signals X1, Y1, X2, and Y2. Signal RF1X, RF2X, RF1Y, and RF2Y result from four simultaneous read operations using register numbers from the selected operations as addresses in register file 195.

Signals DV1X, DV2X, DV1Y, and DV2Y result from four simultaneous reads of result buffer 154 where the entries read correspond to the entries scheduler 150 found during broadcast phase of the associated operation.

Figure 5:
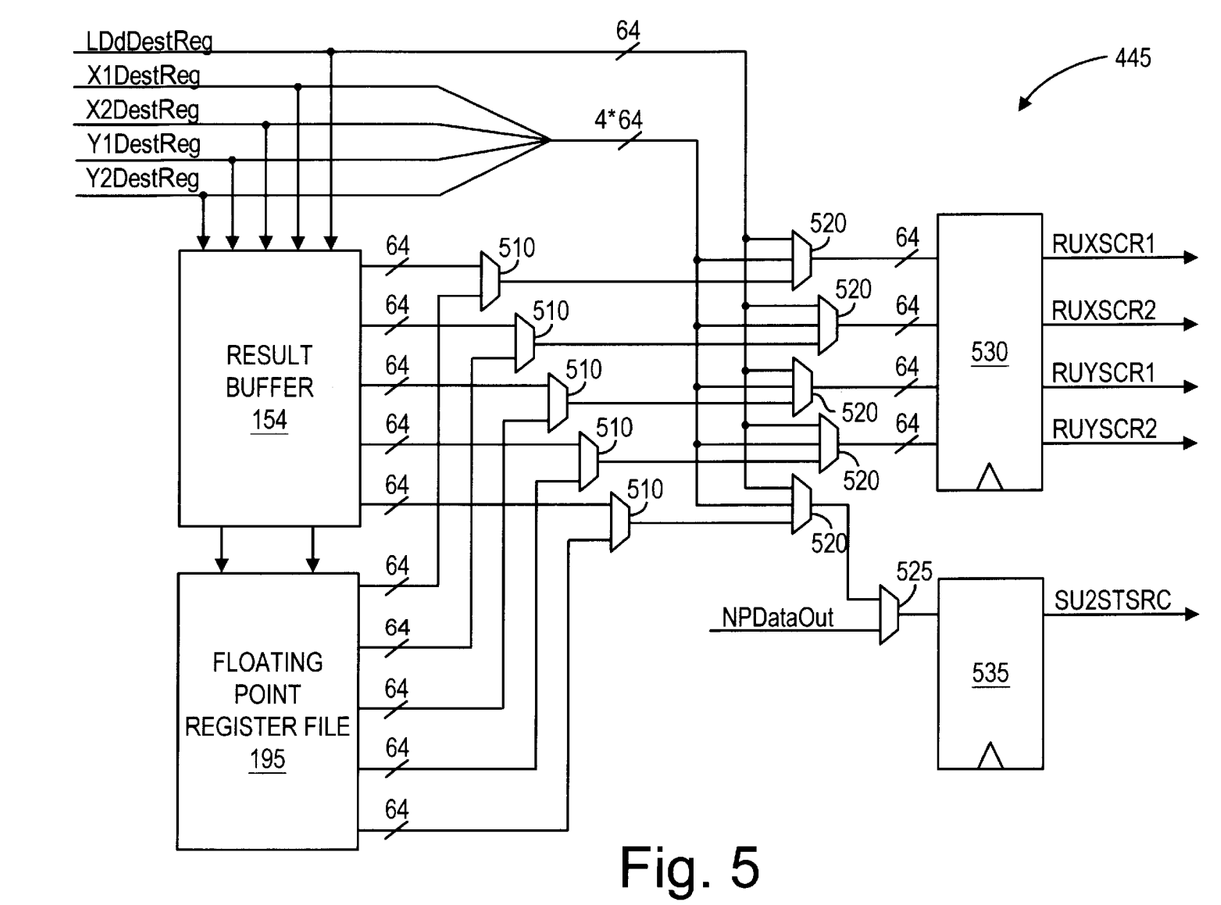
FIG. 5 is a block diagram illustrating operand storage and operand selection circuits for the execution unit of FIG. 4.

FIG. 5 illustrates an embodiment of operand selection circuit 445. Result buffer 154 and register file 195 each simultaneously provide five potential operands, two for each of the pipelines X and Y in execution unit 180 and one for store unit 170. In selection circuit 445, each multiplexer 510 selects the operand from buffer 154 or register file 195 depending on an associated one of signals SCNTL. If one of signals SCNTL selects register file 195 as a source, then an associated one of multiplexers 520 passes the signal from register file 195 to a latch 530 or through a multiplexer 525 to a latch 535. If the signal SCNTL selects result buffer 154 as an operand source, the associated multiplexer 520 selects the signal from the associated multiplexer 510 or a signal X1DestReg, X2DestReg, Y1DestReg, or Y2DestReg from a result bus of execution unit 184, the signal from the result bus being selected if the entry of buffer 154 providing the operand corresponds to an operation that execution unit 184 has not completed. If the signal SCNTL selects a result bus as the operand source, the associated multiplexer 520 selects signal X1DestReg, X2DestReg, Y1DestReg, Y2DestReg, or LDDestReg from the identified result bus, but issue control 430 asserts a hold to stop the operation from issuing if the operation providing the source operand is in the first execution stage. Holding up pipeline X or Y prevents scheduler 150 from issuing the operation at the end of the clock cycle.

Figure 6:
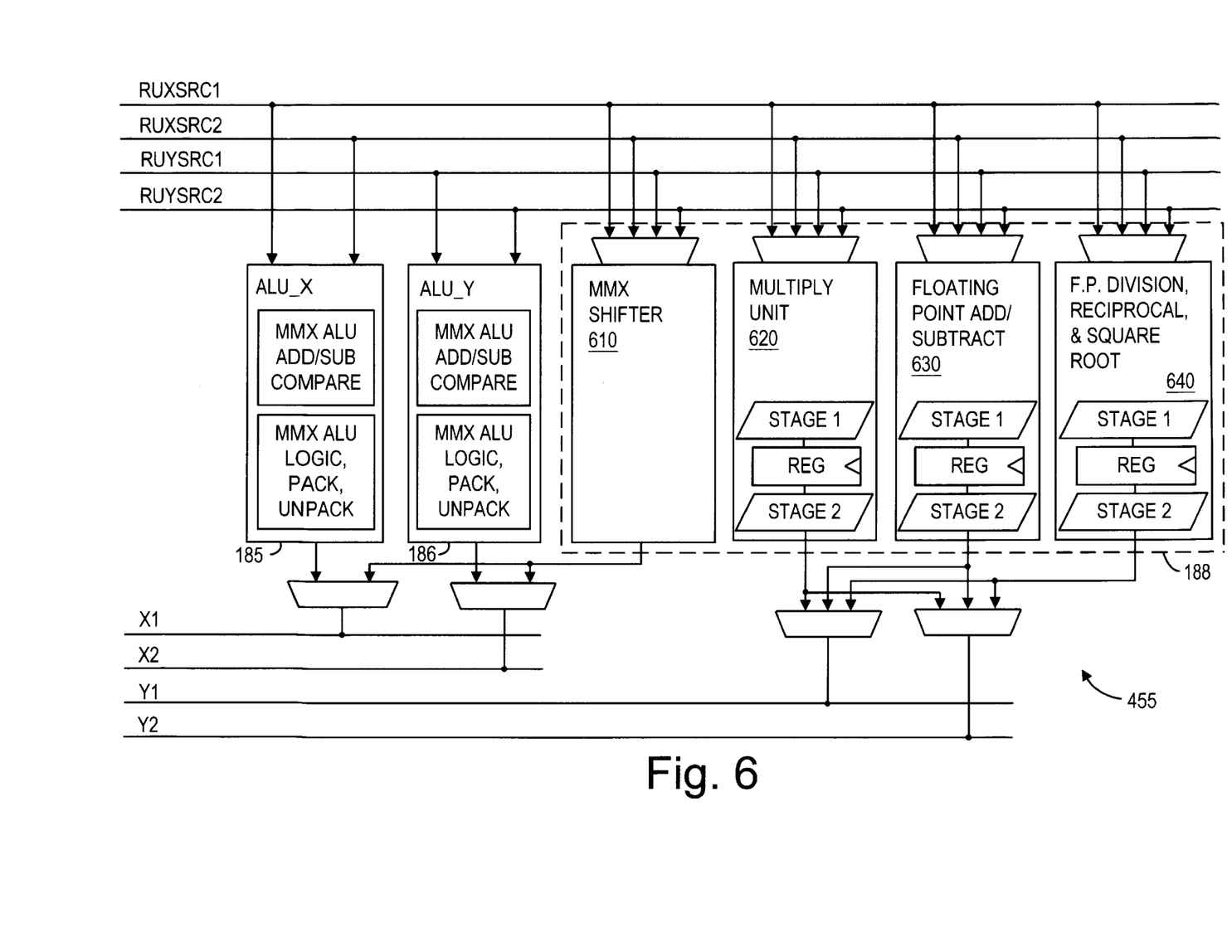
FIG. 6 is a block diagram illustrating functional units for the execution unit of FIG. 4.

For operations issued to execution pipeline X, execution data path 455 routes operand signals RUXSRC1 and RUXSRC2 from operand selection circuit 445 to execution circuit 185 or 188 that executes the first execution stage of the operation that decoder 420 and pipeline control 450 identifies for pipeline X. For operations issued to execution pipeline Y, execution data path 455 routes operand signals RUYSRC1 and RUYSRC2 from operand selection circuit 445 to execution circuit 186 or 188 that executes the first execution stage of the operation that decoder 420 and pipeline control 450 identifies for pipeline Y. FIG. 6 is a block diagram of one embodiment of data paths 455. In FIG. 6, processing circuits 185 and 186 include circuits for performing MMX ALU operations such as SIMD add, subtract, compare, logic, pack, and unpack operations. In this embodiment, processing circuits 185 and 186 only perform single-stage operations. Shared execution circuits 188 include a shifter 610, a multiplier 620, a floating point adder 630, and a divider 640 for MMX and 3D NOW operations. Shifter 610 has a single-stage execution pipeline. Multiplier 620, adder 630, and divider 640 implement two-stage execution pipelines.

Data paths 455 have four result buses for result signals X1, X2, Y1, and Y2. Result signals X1 and Y1 represent results for one-stage operations respectively executed in the X and Y pipelines. Execution circuits 185 and 186 when used respectively generate signals X1 and Y1. MMX shifter 610 can replace either circuit 185 or 186 in the X or Y pipeline and generate either signal X1 or Y1. Result signals X2 and Y2 represent results for two-stage operations respectively executed in the X and Y pipelines. Multiplier 620, adder 630, and divider 640 can be in either pipeline X or Y, and any two of multiplier 620, adder 630, and divider 640 can begin two-stage operations at the same time.

Scheduler 150 can issue up to two operations to data paths 445 per clock cycle. In particular, data paths 455 permit scheduler 150 to issue no operation, a single-stage operation, or a two-stage operation to each pipeline provided that processing resources are available for the operations. As a result, up to four results can be completed per clock cycle. Data paths 455 provide four valid result signals in a clock cycle if two one-stage operations were issued to data paths 455 one clock cycle after two two-stage operations were issued to data paths 455. Result buffer 154 has five write ports for simultaneous writing up to four results from data paths 455 and a result signal LD from load unit 175. Buffer control 460 controls the simultaneous reading and writing to result buffer 154.

Execution pipeline control circuit 450 receives in decoded opcode information for up to two operations in the first execution stage and up to two operations in the second execution stage and controls data path 455 for completion of issued operations. Buffer control 460 controls writing of up to four results X1, X2, Y1, and Y2 from data paths 455 to buffer 154, writing a load result LD to buffer 154, reading of up to four source operands DV1X, DV2X, DV1Y, and DV2Y from result buffer 154 for the selected operations, and reading a store value DVST from result buffer 154.

The appendix contains a listing of a program providing a circuit description of an exemplary embodiment of control and scheduling circuitry for processing circuits 184. In the appendix, modules mmxopfifo, mmxopdecode, mmxopisct1, and mmxfnct1 respectively correspond to embodiments of opcode FIFO 410, opcode decoder 420, operation issue control 430, and execution pipeline control 450. Modules mmxbypct1 and mmxdvwrct1 respectively correspond to embodiments of operand bypass control 440 and buffer control 480.

Although the invention has been described with reference to a particular embodiment, the description is only an example of the invention's application and should not be taken as a limitation. Various other adaptations and combinations of features of the embodiments disclosed are within the scope of the invention as defined by the following claims.

We claim:

1. A processor comprising:

an execution unit capable of executing a first type of operation and a second type of operation, wherein operations of the first type have a first latency and operations of the second type have a second latency that differs from the first latency; and a scheduler that issues operations to the execution unit for execution, wherein unless a selected operation is held up, the scheduler issues the selected operation upon determining that operands required for the selected operation are valid, wherein the scheduler bases the determination on a presumption that operations issued to the execution unit complete after the first latency, wherein the execution unit comprises scheduling circuitry that holds up issue of the selected operation when a required operand that the scheduler determines is valid is not valid.

2. The processor of claim 1, wherein the first latency is one clock cycle, and the second latency is longer than one clock cycle.

3. The processor of claim 1, wherein:

the scheduler generates a selection signal that if the presumption used in the scheduler is correct, identifies one of a plurality of operand signals as a source of an operand for the selected operation when issued to the execution unit; and the execution unit further comprises a bypass circuit that changes the selection signal if the presumption used in the scheduler is incorrect and the scheduler incorrectly identified the operand signal that provides the operand for the selected operation.

4. The processor of claim 3, wherein the execution unit further comprises an issue control circuit that asserts a hold signal to prevent the scheduler from issuing the selected operation when none of the operand signals can provide a valid operand when required for the selected operation.

5. The processor of claim 4, further comprising:

a register file;

a buffer coupled to store results from the execution unit; and result buses of the execution unit, wherein the register file, the buffer, and the result buses provide the plurality of operand signals.

6. The processor of claim 5, wherein the bypass circuit changes the selection signal to select an operand signal from one of the result buses when the scheduler incorrectly identifies an operand signal from the buffer as the source of the operand.

7. The processor of claim 5, wherein the issue control circuit asserts the hold signal when the scheduler incorrectly identifies an operand signal from one of the result buses as the source of the operand.

8. The processor of claim 1, further comprising:

a register file;

a buffer coupled to store results from the execution unit; and an operation commit circuit coupled to write result values from the buffer to the register file, the operation commit circuit writing a result corresponding to an operation only after determining that a program flow requires execution of the operation and speculative execution of the operation is complete, wherein:

the scheduler provides to the operation commit unit a signal indicating whether the presumption used by the scheduler implies that speculative execution of an operation is complete; and the execution unit provides to the operation commit unit a signal that confirms completion of the speculative execution of the operation.

9. The processor of claim 1, further comprising a store unit that executes store operations, wherein the execution unit generates a signal to the store unit indicating whether a store operand for a store operation is valid, and in response to the signal from the execution unit. the store unit holds up completion of the store operation until the store operand is valid.

10. The processor of claim 1, further comprising a store unit that executes store operations, wherein the scheduler generates a selection signal identifying a source of a store operand for the store unit, and before using the store operand that the selection signal identifies, the store unit changes the selection signal when the presumption used in the scheduler causes the selection signal from the scheduler to identify an invalid source.

11. The processor of claim 1, wherein:
- before issuing the selected operation, the scheduler broadcasts to the execution unit information regarding the required operands for the selected operation; and
- the execution unit generates a signal to hold up issue of the selected operation if a source of one of the required operands is result of an operation that is being executed and has a latency longer than the first latency.

12. A method comprising:
- scheduling execution of operations in a processor using a scheduler for a plurality of execution units that are capable of operating in parallel, wherein the operations being scheduled include a first type having a first execution latency and a second type having a second execution latency that differs from the first execution latency;
- issuing a first operation for execution;
- determining in the scheduler that a required operand for a second operation will be valid at an expected issue time for the second operation, wherein the determining presumes that all operations have the first execution latency;
- determining in an execution unit whether the first operation will provide the required operand with a valid value at the expected issue time, wherein the execution unit activates a hold signal to the scheduler upon determining that the required operand will not be valid at the expected issue time; and
- issuing the second operation from the scheduler, wherein the scheduler issues the second operation at the expected issue unless the execution unit activates the hold signal.

13. The method of claim 12, wherein issuing the first operation and issuing the second operation issue the first and second operations to one execution unit.

14. The method of claim 12, wherein issuing the first operation and issuing the second operation issue the first and second operations to different execution units.

15. The method of claim 12, further comprising broadcasting a first signal before the expected issue time to identify the first operation as a source of the required operand for the second operation, wherein in response to the first signal, the execution unit activates the hold signal.

* * * * *